(12) United States Patent
Toly

(10) Patent No.: US 7,594,815 B2
(45) Date of Patent: Sep. 29, 2009

(54) LAPAROSCOPIC AND ENDOSCOPIC TRAINER INCLUDING A DIGITAL CAMERA

(76) Inventor: Christopher C. Toly, 2317 W. Newton St., Seattle, WA (US) 98199

( * ) Notice: Subject to any disclaimer, the term of this patent is extended or adjusted under 35 U.S.C. 154(b) by 737 days.

(21) Appl. No.: 10/672,274

(22) Filed: Sep. 24, 2003

(65) Prior Publication Data

US 2005/0064378 A1    Mar. 24, 2005

(51) Int. Cl.
G09B 23/28    (2006.01)
(52) U.S. Cl. ...................................... 434/262
(58) Field of Classification Search ................ 434/262, 434/267, 268, 272, 307 R, 308, 365; 345/156; 703/7; 318/567
See application file for complete search history.

(56) References Cited

U.S. PATENT DOCUMENTS

| | | | |
|---|---|---|---|
| 4,134,218 A | | 1/1979 | Adams et al. |
| 4,273,682 A | | 6/1981 | Kanamori |
| 4,360,345 A | | 11/1982 | Hon |
| 4,898,173 A | | 2/1990 | Daglow et al. |
| 4,907,973 A | * | 3/1990 | Hon ............................ 434/262 |
| 5,149,270 A | | 9/1992 | McKeown |
| 5,205,286 A | | 4/1993 | Soukup et al. |
| 5,368,487 A | * | 11/1994 | Medina ...................... 434/262 |
| 5,403,191 A | * | 4/1995 | Tuason ....................... 434/262 |
| 5,436,542 A | * | 7/1995 | Petelin et al. ............... 318/567 |
| 5,589,838 A | | 12/1996 | McEwan |
| 5,609,615 A | | 3/1997 | Sanders et al. |
| 5,620,326 A | * | 4/1997 | Younker ..................... 434/268 |
| 5,722,836 A | * | 3/1998 | Younker ..................... 434/272 |
| 5,734,418 A | | 3/1998 | Danna |
| 5,754,313 A | | 5/1998 | Pelchy et al. |

(Continued)

FOREIGN PATENT DOCUMENTS

DE    4212908 A1    10/1993

(Continued)

OTHER PUBLICATIONS

"*The Good, The Bad, and The Ugly*", Target material. Kaman Measuring Systems, 2004, 3pages. <http://www.kamansensors.com/html/technology/technology-tntargetmaterial.htm>.

(Continued)

*Primary Examiner*—Cameron Saadat
*Assistant Examiner*—Banafsheh Hadizonooz
(74) *Attorney, Agent, or Firm*—Ronald M. Anderson

(57) ABSTRACT

A videoendoscopic surgery training system includes a housing defining a practice volume in which a simulated anatomical structure is disposed. Openings in the housing enable surgical instruments inserted into the practice volume to access the anatomical structure. A digital video camera is disposed within the housing to image the anatomical structure on a display. The position of the digital video camera can be fixed within the housing, or the digital video camera can be positionable within the housing to capture images of different portions of the practice volume. In one embodiment the digital video camera is coupled to a boom, a proximal end of which extends outside the housing to enable positioning the digital video camera. The housing preferably includes a light source configured to illuminate the anatomical structure. One or more reflectors can be used to direct an image of the anatomical structure to the digital video camera.

21 Claims, 9 Drawing Sheets

U.S. PATENT DOCUMENTS

| | | | |
|---|---|---|---|
| 5,800,178 A | 9/1998 | Gillio | |
| 5,800,179 A * | 9/1998 | Bailey | 434/262 |
| 5,832,772 A | 11/1998 | McEwan | |
| 5,853,292 A | 12/1998 | Eggert et al. | |
| 5,873,732 A * | 2/1999 | Hasson | 434/262 |
| 5,883,591 A | 3/1999 | McEwan | |
| 5,947,743 A | 9/1999 | Hasson | |
| 6,074,213 A * | 6/2000 | Hon | 434/262 |
| 6,095,148 A | 8/2000 | Shastri et al. | |
| 6,113,395 A * | 9/2000 | Hon | 434/262 |
| 6,139,489 A | 10/2000 | Wampler et al. | |
| 6,211,904 B1 | 4/2001 | Adair et al. | |
| 6,256,012 B1 | 7/2001 | Devolpi | |
| 6,270,491 B1 | 8/2001 | Toth et al. | |
| 6,428,323 B1 | 8/2002 | Pugh | |
| 6,436,035 B1 | 8/2002 | Toth et al. | |
| 6,470,302 B1 * | 10/2002 | Cunningham et al. | 703/7 |
| 6,485,308 B1 * | 11/2002 | Goldstein | 434/267 |
| 6,527,704 B1 | 3/2003 | Chang et al. | |
| 6,532,379 B2 | 3/2003 | Stratbucker | |
| 6,654,000 B2 * | 11/2003 | Rosenberg | 345/156 |
| 6,659,776 B1 | 12/2003 | Aumann et al. | |
| 6,863,536 B1 * | 3/2005 | Fisher et al. | 434/272 |
| 6,902,405 B2 * | 6/2005 | Irion et al. | 434/272 |
| 2001/0000187 A1 | 4/2001 | Peckham et al. | |
| 2002/0126501 A1 | 9/2002 | Toth et al. | |
| 2003/0068607 A1 * | 4/2003 | Gregorio et al. | 434/262 |
| 2004/0033476 A1 * | 2/2004 | Shun | 434/262 |
| 2005/0084833 A1 * | 4/2005 | Lacey et al. | 434/262 |
| 2005/0142525 A1 * | 6/2005 | Cotin et al. | 434/262 |

FOREIGN PATENT DOCUMENTS

| | | |
|---|---|---|
| EP | 0 217 689 A1 | 11/1986 |
| EP | 0 601 806 A2 | 3/1993 |
| EP | 0624861 A2 * | 5/1994 |
| FR | 2 691 826 A1 | 12/1993 |
| GB | 2338582 A * | 12/1999 |
| WO | WO 93/21619 | 10/1993 |
| WO | WO 95/02233 * | 1/1995 |
| WO | WO 01/32249 | 5/2001 |
| WO | WO 2005083653 A1 * | 9/2005 |

OTHER PUBLICATIONS

"*Variable Impedance Transducers*", Kaman Measuring Systems, 2004, 2 pages. <http://www.kamansensors.com/html/technology/technology-variable.htm>.

"*Differential Impedance Transducers*", Kaman Measuring Systems, 2004, 2 pages. <http://www.kamansensors.com/html/technology/technology-differential.htm>.

"*A Low-Power Hall-Effect Switch*," Sensors Magazine, Jun. 1999, Christine Graham, 2 pages,Allegro MicroSystems, Inc., USA. <http://www.allegromicro.com/techpub2/3210/3210papr.htm>.

"*PNI SEN-S65 Magneto-Inductive Sensor*," Mar. 2004, PNI Corporation, 5464 Skylane blvd., Santa Rosa, CA 95403-1084 USA, 1page. <http://www.pnicorp.com>.

"*Giant Magnetic Resistive Potentiometers with Strong Potentialities*," (CORDIS focus, No. 45, Oct. 2003), 2pages. <http://www.sensorsportal.com/HTML/Potentiometers_Projects.htm>.

"*Non-contact Thread Detection*," (Sensor Applications, Application Story, Mar. 2002), 2 pages. <http://www.sensorland.com/AppPage049.html>.

"*The Hall Effect*," How they Work, How Sensors Work—HART Protocol, Sep. 22, 2004, 2 pages. <http://www.sensorland.com/HowPage046.html>.

"*Technical Advances in Hall-Effect Sensing*", (Product Description) Allegro® MicroSystems, Inc, Gilbert, Joe, 6 pages.

* cited by examiner

LAPAROSCOPIC AND ENDOSCOPIC TRAINER INCLUDING A DIGITAL CAMERA

FIELD OF THE INVENTION

The present invention generally relates to a surgical training apparatus, and more particularly to a surgical trainer that realistically simulates videoendoscopic surgery.

BACKGROUND OF THE INVENTION

In recent years many fully invasive surgical and operative medical procedures have been adapted to utilize videoendoscopic techniques to achieve minimally invasive procedures. Rather than requiring a relatively large incision to gain access to internal anatomical structures, videoendoscopic techniques require a plurality of much smaller incisions. Generally, one incision is made for a videoendoscopic camera, and two or more incisions are made to introduce surgical instruments. The diameters of the surgical instruments and the probe for the videoendoscopic camera are made as small as practical, to minimize the size of the incisions that are required. The endoscope is used to enable the surgeon to view, in real-time, the surgical field and the manipulation of the endoscopic instruments within that field.

The majority of the videoendoscopic cameras in use today employ an optical fiber to transmit an image of the internal surgical field to a video camera that is disposed externally. Exemplary videoendoscopic cameras are described in U.S. Pat. No. 6,527,704 (Chang et al.). As indicated in FIGS. 1A and 1B of the Chang et al. patent, such systems tend to include a plurality of external components that are mounted together in a rack that can be moved from one operating theater or room to another, as required. While such systems work well in a surgical theater, their size, weight, limited mobility, and cost make such systems ill-suited for use in a training environment, where highly portable and lower cost devices are very desirable.

As technology improves so as to enable a substantial reduction in the size of video cameras, it has been suggested to employ small internal video cameras that have been inserted within the body of a patient, instead of using an optical fiber to transmit the image from the surgical field to an external video camera. Systems of this type are described in U.S. Pat. No. 5,754,313 (Pelchy et al.), U.S. Pat. No. 6,139,489 (Wampler et al.), and U.S. Pat. No. 6,211,904 (Adair et al.). However, at the present time, small video cameras that can be disposed at an internal surgical field have not supplanted more conventional videoendoscopic systems that employ fiber optics to transmit internal images to an external camera, either for actual surgical use or in a training context, such as simulations or skill development exercises.

The need for endoscopic surgical training systems is significant. Hand eye coordination skills useful in conventional surgery do not translate well into endoscopic surgery. In conventional surgery, a surgeon is able to look directly at the treatment site, and is generally able to see his bands and the instruments in the surgical field in three dimensions. In videoendoscopic surgery, the surgeon is not able to feel the tissue and/or organs associated with an operative site first hand, because the surgeon remotely manipulates the tissue and/or organs using elongate surgical tools from outside the surgical field. Further, the surgeon observes a two-dimensional image of the surgical field. The ability to work from a two-dimensional image of the surgical field, while remotely manipulating instruments, requires a significant amount of training. It is critical that surgeons be taught and thereafter practice videoendoscopic skills that will help them to identify structures and carefully control endoscopic instruments, to ensure that surgical procedures are accurately performed, and to avoid unnecessary damage to surrounding tissue. Even basic surgical skills, such as suturing and knot tying, become challenging when performed endoscopically. In a videoendoscopic environment, such basic surgical tasks require great skill and precision, which can only be achieved through training and practice.

For surgeons or students who require basic training, skills unique to videoendoscopic surgery need to be learned. Two-dimensional recognition skills must be learned, as well as the manipulation of objects using elongate surgical instruments. Another skill that needs to be learned is the ability to use such elongate surgical instruments to manipulate objects when the view of the workspace is very restricted.

A wide variety of different elongate surgical instruments have been developed, and continue to be developed, for use in endoscopic surgery. Even surgeons who have mastered two-dimensional recognition skills and the manipulation of objects using elongate surgical instruments welcome the opportunity to familiarize themselves with new instruments in a training context, prior to using such instruments during an actual procedure.

Surgeons and other medical personnel can be trained in endoscopic surgical techniques using animal specimens or human cadavers. However, such training methods are very expensive, since animals and cadavers are in limited supply and cannot be used repeatedly. Also, animal specimens and human cadavers are not readily portable.

Many endoscopic techniques, such as instrument manipulation, can be successfully learned using simple box trainers. Such trainers generally include a housing in which a simulated anatomical structure is placed. Students can manipulate instruments passing through openings in the housing to gain confidence in such skills as suturing and knot tying. Some box trainers have openings through which the student can look to directly observe the simulated anatomical structure. While such a trainer is effective for gaining skills related to remote manipulation of endoscopic instruments, since the trainee looks directly at the simulated anatomical structure, two-dimensional recognition skills cannot be learned and practiced. Thus, some box trainers employ mirrors that reflect an image of the practice site, so that the trainee can also gain the necessary two-dimensional recognition skills. U.S. Pat. No. 5,722,836 (Younker) discloses one such box trainer.

Box trainers are relatively inexpensive and very portable, and are therefore desirable teaching tools. It must be recognized, however, that box trainers, including those that employ mirrors to develop two-dimensional recognition skills, do not provide a very realistic simulation of a true videoendoscopic procedure. During an actual endoscopic procedure, the surgeon will be observing an image displayed on a monitor. While a conventional endoscopic camera could be introduced into a box trainer to provide a video image of the simulated anatomical structure at a practice site, conventional endoscopic cameras are not very portable, and are very expensive. Such a training system, while being more realistic in simulating an actual surgical environment than a box trainer with a mirror, no longer offers the low cost and portability of a box trainer alone. It would thus be desirable to provide a low cost and highly portable trainer that is capable of providing a video image of a practice volume and of remotely manipulated endoscopic instruments being utilized within the practice volume.

SUMMARY OF THE INVENTION

The present invention is a surgical trainer for practicing videoendoscopic surgical techniques. The surgical trainer includes a relatively low-cost, portable digital camera disposed within the trainer, configured to provide a substantially real-time image of a practice volume defined by the trainer housing. Various embodiments are contemplated, including embodiments in which the position of the digital camera is fixed, and embodiments in which the digital camera is selectively positionable to obtain an image of different portions of the practice volume.

A first embodiment includes a housing defining a practice volume, and a digital camera disposed within the practice volume. The digital camera is configured to capture a plurality of frames per second, such that the digital camera can provide a video feed imaging of at least a portion of the practice volume. Preferably, an anatomical structure is disposed in the practice volume. In at least one embodiment, the anatomical structure is disposed within a lower portion of practice volume. The digital camera is positioned within the practice volume relative to the anatomical structure such that a video feed imaging the anatomical structure obtained using the digital camera realistically simulates a video feed of an internal surgical field obtained by either a conventional laparoscopic camera or a conventional endoscopic camera.

The housing is preferably configured to enable a trainee to insert elongate medical tools (i.e., endoscopic tools) into the practice volume to perform either a simulated procedure upon the anatomical structure by manipulating the elongate medical tools from outside the housing, or to perform endoscopic skills training exercises. The position of the digital camera within the housing is selected to ensure that the digital camera does not interfere with a range of motion required by the elongate medical tools to successfully perform the simulated procedure or exercises.

In one embodiment, the digital camera is movably positionable within the practice volume so that when a position of the anatomical structure is changed, the position of the digital camera can be changed to continue to provide a video feed imaging the anatomical structure. Movement of the digital camera enables a field of view obtained by the digital camera to be varied. Such movement enables the digital camera to obtain an image of at least a portion of the practice volume from a plurality of different angles. Preferably, movement of the digital camera will enable the proximity of the digital camera to be varied relative to at least a portion of the practice volume. Movable and positionable digital cameras are particularly beneficial for training involving the simulation of an actual endoscopic procedure, such as suturing, because endoscopic procedures often require the field of view provided by the endoscope, which is generally quite limited, to be shifted as the procedure progresses. As will be discussed in more detail below, it is particularly advantageous if the digital camera can be moved in a manner that enables the digital camera to move closer to (or farther from) a desired portion of the practice volume (i.e. to zoom in on or away from a particular portion of the practice volume). The ability simulates a technique often employed in videoendoscopy; moving a laparoscope or endoscope closer to (or away from) a particular portion of a surgical field, to zoom in (or out) relative to a specific portion of the surgical field. In another embodiment, the position of the digital camera is fixed, and the digital camera is configured to image a predefined portion of the practice volume. Trainers having digital cameras in fixed positions are particularly useful for skill based training exercises, such as basic instrument manipulation and two-dimensional recognition skills. If the field of view provided by a fixed digital camera is sufficiently broad, or if the simulated anatomical structure or other work piece can readily be repositioned relative to the digital camera, such an embodiment can also be used for simulating an actual endoscopic procedure.

In yet another embodiment, the digital camera is disposed in an upper portion of the practice volume, and light traveling along a light path from the anatomical structure to image acquisition elements in the digital camera moves in a generally upward direction. This configuration facilitates obtaining a "bird's eye view" of the anatomical structure, which most often will be disposed in a lower portion of the practice volume. Another embodiment includes at least one optical reflector used to direct light traveling along a light path from the anatomical structure to image acquisition elements in the digital camera, toward the digital camera. The use of one optical reflector provides a reverse image, while the use of two optical reflectors provides a normal (i.e., un-reversed) image. Of course, digital signal processing can be used to electronically reverse an image obtained using the digital camera. The use of properly positioned optical reflectors enables the digital camera to be disposed in a lower portion of the practice volume, and yet still obtain a bird's eye view of an anatomical structure that is also disposed in the lower portion of the practice volume.

One embodiment of the surgical trainer includes a support structure to which the digital camera is coupled. The support structure includes a ball head that enables the digital camera to pan and tilt. In another embodiment, the support structure includes a pan and tilt head. The support structure is either substantially enclosed within the housing, or extends beyond the interior portion of the housing.

Preferably, the support structure includes an elongate member having a proximal end disposed outside the practice volume, and a distal end disposed inside the practice volume. The digital camera is coupled with the distal end of the elongate member, such that a manipulation of the proximal end of the support structure changes a position of the digital camera within the practice volume. In at least one embodiment the proximal end of the elongate member includes a handle configured to simulate the handle of a conventional laparoscope. Embodiments that include an elongate member structure preferably also include a mounting bracket configured to support the elongate member. In some embodiments, the mounting bracket is configured to slidingly engage the elongate member, such that an amount of the elongate member disposed within the practice volume can be increased and decreased as desired. Such movement enables the digital camera to move closer to or away from portions of the practice volume, enabling the digital camera to zoom in or out. While some digital cameras include digital and/or optical zooms, requiring or enabling a user to manipulate the elongate member to achieve a desired zoom simulates the manipulation required of a conventional laparoscope or endoscope to achieve a similar zoom, increasing a realism of the training experience. In some embodiments the mounting bracket is configured to pivotally engage the elongate member, such that a position of the distal end of the elongate member within the practice volume can be adjusted. In some embodiments the mounting bracket is configured to pivotally engage the housing, such that a position of the distal end of the elongate member within the practice volume can be adjusted. Particularly preferred mounting brackets enable different ranges of motion to be achieved.

In some embodiments, the housing includes a panel through which medical instruments can be inserted to gain access to the practice volume. Such a panel can be disposed on a front side of the housing, or more preferably, on a top of the housing. An opaque cover can be employed to prevent a trainee from obtaining a clear view of the practice volume, thereby encouraging the trainee to rely on the video feed from the digital camera. In some embodiments, the elongate member passes through the panel via an opening that is too small for the digital camera to pass through.

Preferably the surgery trainer will include a light source coupled with the housing and configured to illuminate at least a portion of the practice area. Such a light source is preferably movably coupled to the housing, so that the light source can be moved to selectively illuminate different portions of the practice area. Optionally, the housing can be configured to admit light into the practice volume, such that an external light source can be employed to illuminate the anatomical structure disposed within the practice volume.

Generally, a size of the digital camera is significantly larger than a size of a distal end of a conventional laparoscope, such that the digital camera could not pass through an incision configured to receive a conventional laparoscope. This enables relatively inexpensive digital cameras, such as web cams, to be employed.

Another aspect of the present invention is directed to a videoendoscopic surgery training system for the practice of videoendoscopic surgery techniques. Such a system includes, in addition to a surgical trainer generally consistent with those described above, a computing device configured to receive and process the video feed from the digital camera, and a display upon which the video feed processed by the computing device can be displayed.

Still another aspect of the present invention is a method for simulating one of an endoscopic and a laparoscopic procedure using a digital camera. Such a method includes the step of providing a surgical trainer including a housing, an anatomical structure, and a digital camera with the anatomical structure and the digital camera being disposed within the housing. A next step calls for using the digital camera to obtain a video image of the anatomical structure, then displaying the video image of the anatomical structure on a display. The trainee then performs at least one of a simulated endoscopic and a simulated laparoscopic procedure while viewing the progress of the procedure on the display. In addition to the immediate display of the digital images, the digital images can be stored for later review or transmitted (in real-time or at a later time) over a network to be viewed by others. Also, printouts of selected images can be made.

In other embodiments of the method, the step of using a digital camera to obtain a video image of the anatomical structure includes the steps of positioning at least one of the anatomical structure, the digital camera and a reflector such that the digital camera receives a reflection of the anatomical structure.

Yet another aspect of the present invention is a method for using a digital camera to enhance endoscopic skills training, by providing a substantially real-time image of the skill training exercise. This method includes the step of providing a surgical trainer defining a practice volume in which a digital camera is disposed. The digital camera is then used to obtain a video image of the practice volume that is displayed. The trainee remotely manipulates one or more objects within the practice volume using elongate tools, while viewing the manipulation on the display. The objects can be placed within the practice volume before or after the digital camera is energized. Once again, in addition to the immediate display of the digital images of the manipulations, such digital images can be stored for later review or transmitted in real-time or at a later time) over a network for viewing by others, and printouts of selected images can be made.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 1 schematically illustrates a prior art box trainer for use in teaching endoscopic surgical skills to surgeons and students;

FIG. 2 schematically illustrates a system for teaching endoscopic surgical skills to surgeons and students in accord with the present invention;

Figure 7B:
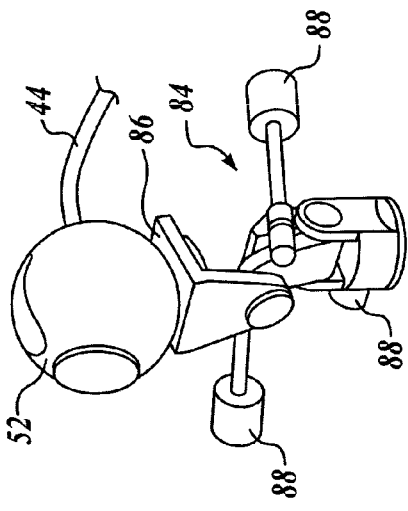
Figure 7C:
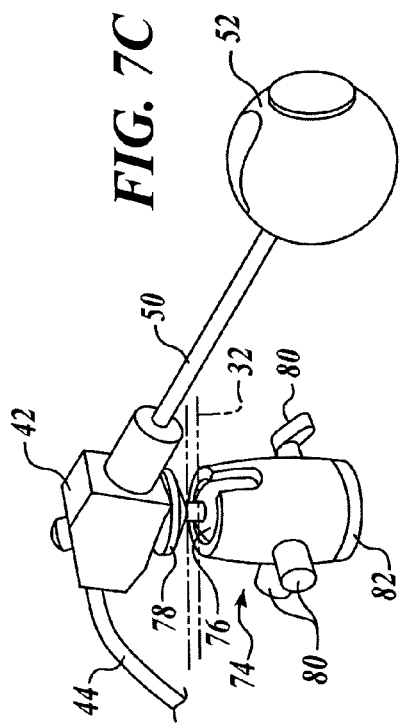
Figure 7A:
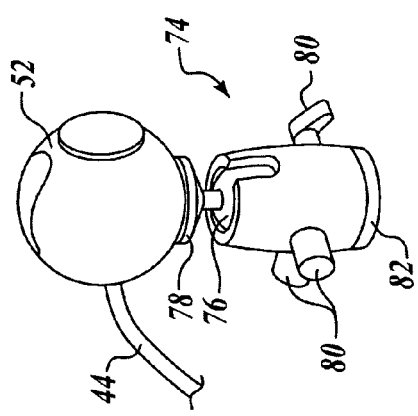
Figure 8:
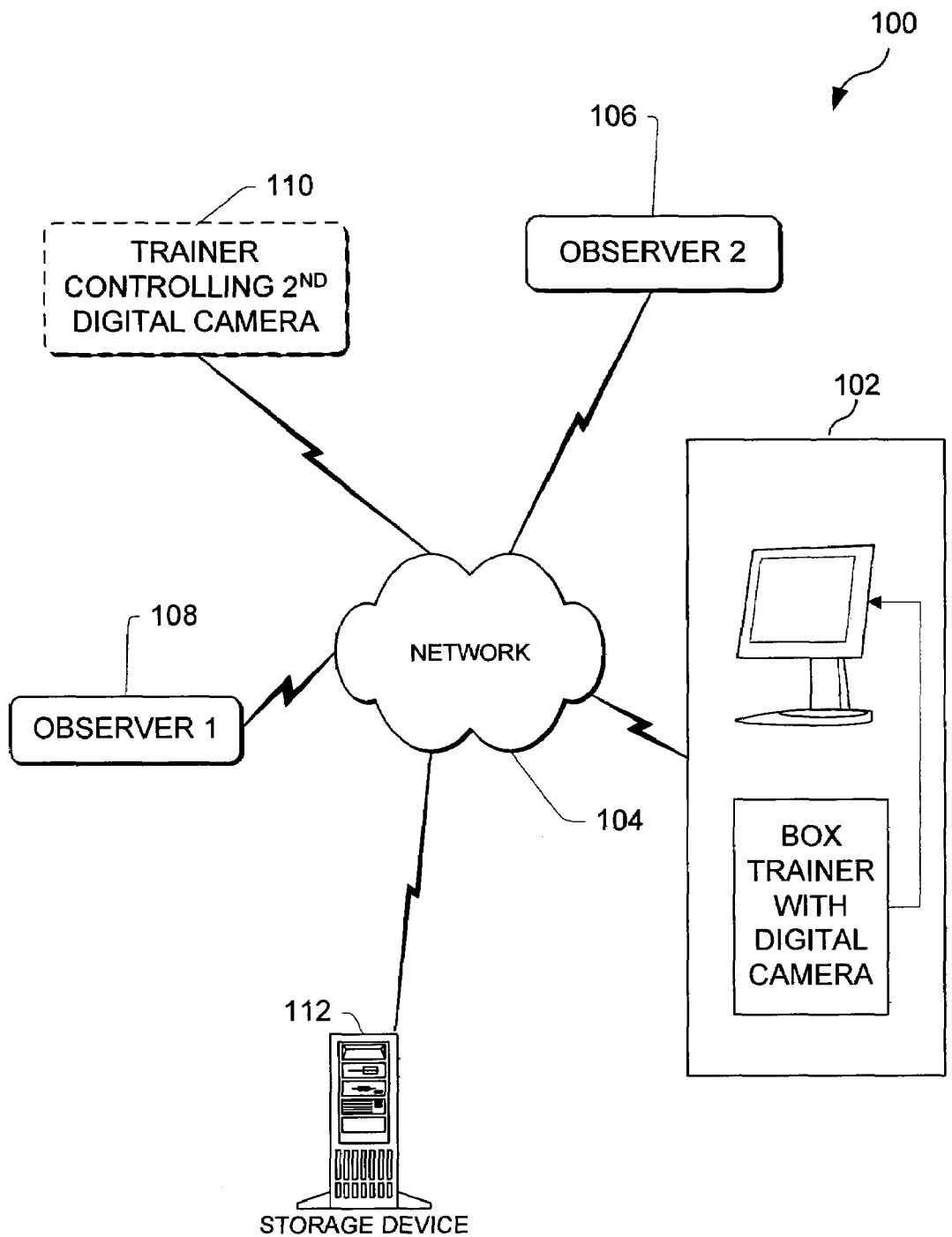
Figure 9A:
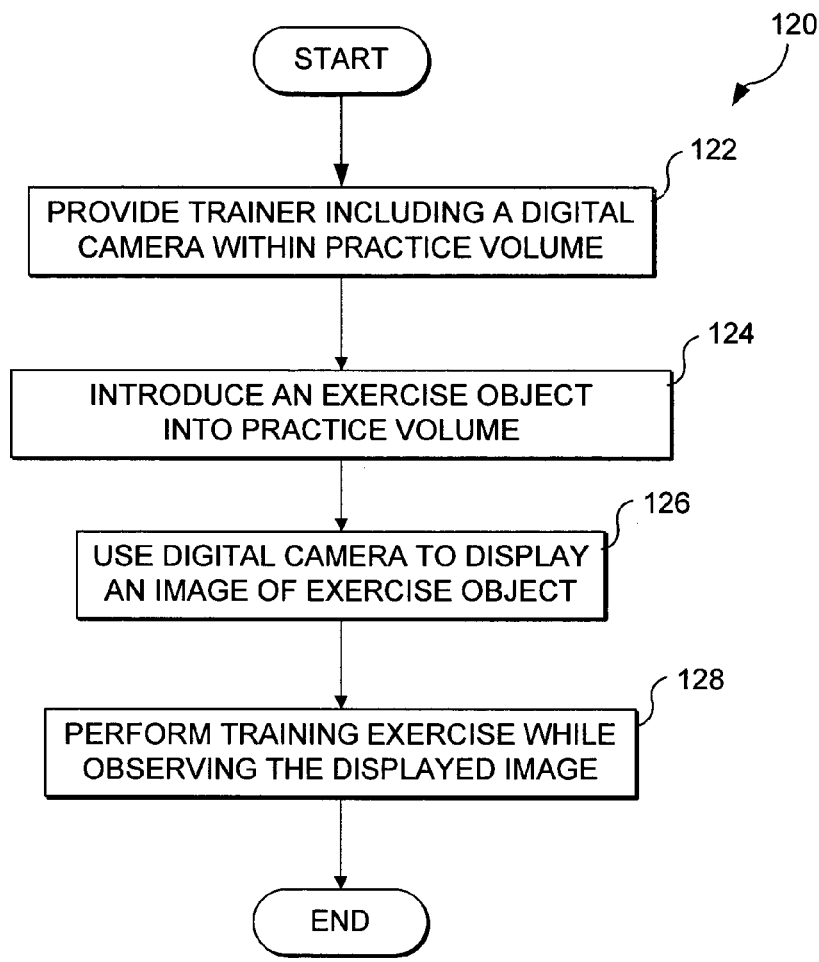
Figure 9B:
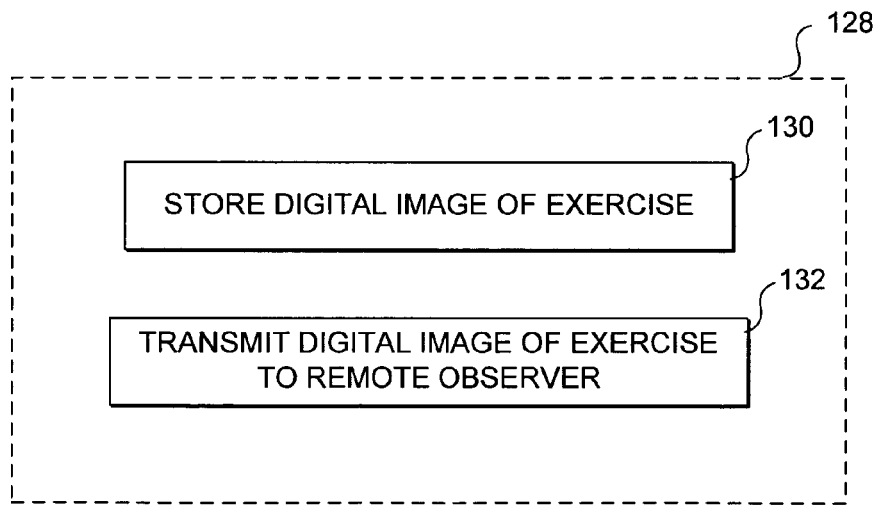

FIG. 7A schematically illustrates a digital camera coupled with a ball mount, such that when the digital camera and ball mount are disposed inside the trainer, the digital camera can be selectively positioned to focus on a particular portion of the practice volume defined by the housing;

FIG. 7B schematically illustrates a digital camera coupled with a pan and tilt head, such that when the digital camera and the pan and tilt head are disposed inside the trainer, the digital camera can be selectively positioned to focus on a particular portion of the practice volume defined by the housing;

FIG. 7C schematically illustrates an elongate member whose proximal end is coupled with a ball mount, and whose distal end is coupled with a digital camera, such that when the ball mount is disposed outside a housing and the digital camera is disposed within the housing, manipulation of the ball mount selectively repositions the digital camera, enabling the digital camera to be directed to capture an image of a particular portion of the practice volume defined by the housing;

FIG. 8 schematically illustrates an exemplary configuration in which a training system in accord with the present invention is coupled to a network, so that images of a training exercise obtained using the digital camera disposed within the practice volume of the training system are transmitted to remote observers who are also coupled to the network;

FIG. 9A is a logical flow diagram showing steps in accord with a method for enhancing videoendoscopic skills training using a digital video camera disposed within the practice volume of a trainer; and FIG. 9B schematically illustrates optional logical steps associated with the logical flow diagram of FIG. 9A.

DESCRIPTION OF THE PREFERRED EMBODIMENTS

Figure 1:
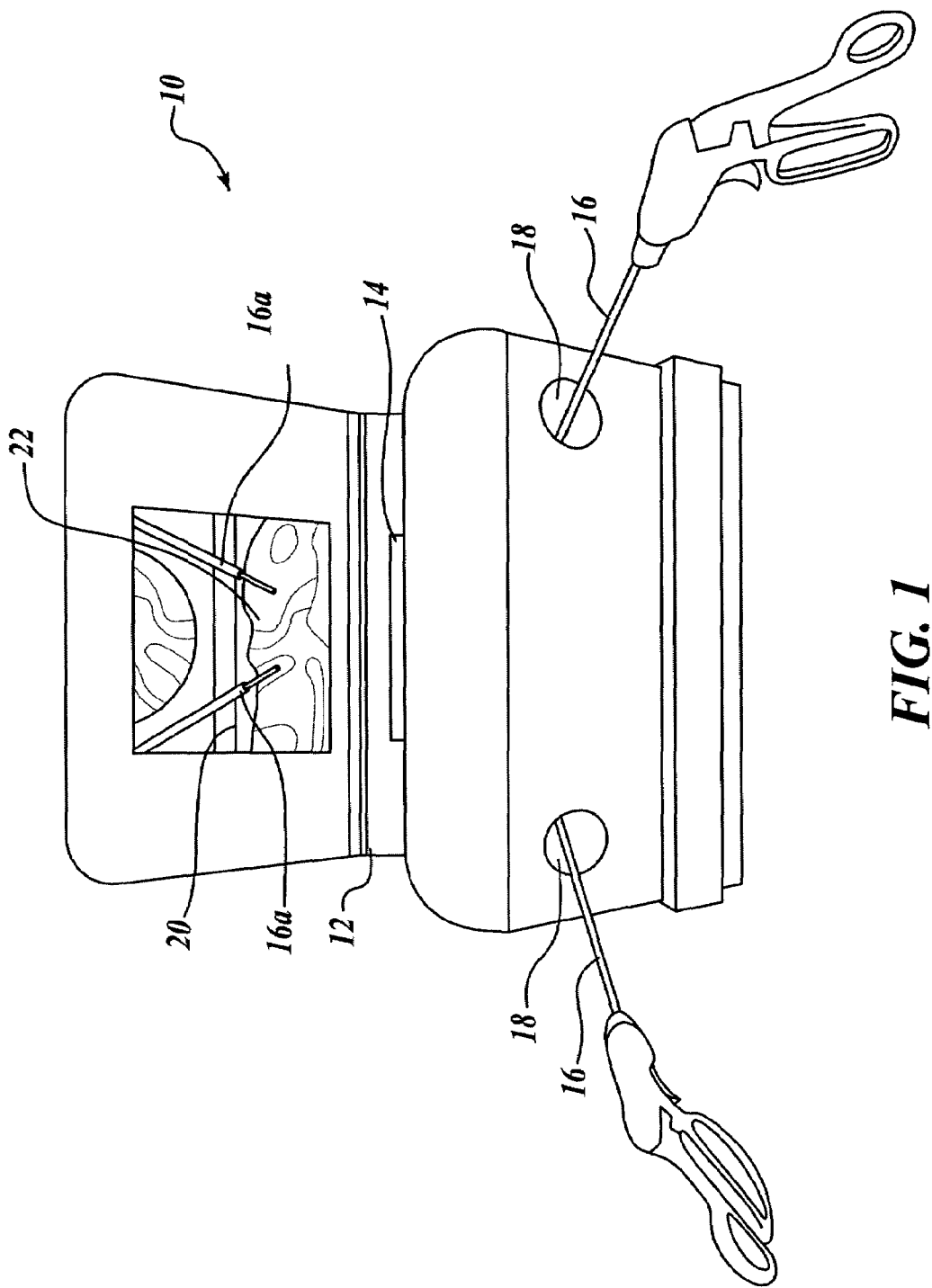

FIG. 1 schematically illustrates a prior art surgical trainer 10 that is configured for video endoscopic surgery training. Trainer 10 includes a housing 12. An anatomical structure 14 is disposed within housing 12, such that portions of housing 12 prevent a trainee from clearly viewing anatomical structure 14. Housing 12 includes a plurality of openings 18 into which surgical instrument 16 can be inserted. Preferably, surgical instruments 16 are endoscopic suturing instruments such as an ENDO STITCH endoscopic reciprocating suturing instrument manufactured by U.S. Surgical, Inc. Trainer 10 includes a reflector 20 in which an image 22 of anatomical structure 14 can be observed by a trainee. Note that distal ends 16a of surgical instruments 16 can be seen within image 22. Surgical trainer 10 thus provides a trainee with an opportunity to practice endoscopical surgical techniques such as suturing and knot tying, as well as gaining experience in two-dimensional pattern recognition. However, image 22 does not realistically simulate an image displayed on a video monitor, such as a surgeon would view during an actual endoscopic procedure.

Figure 2:
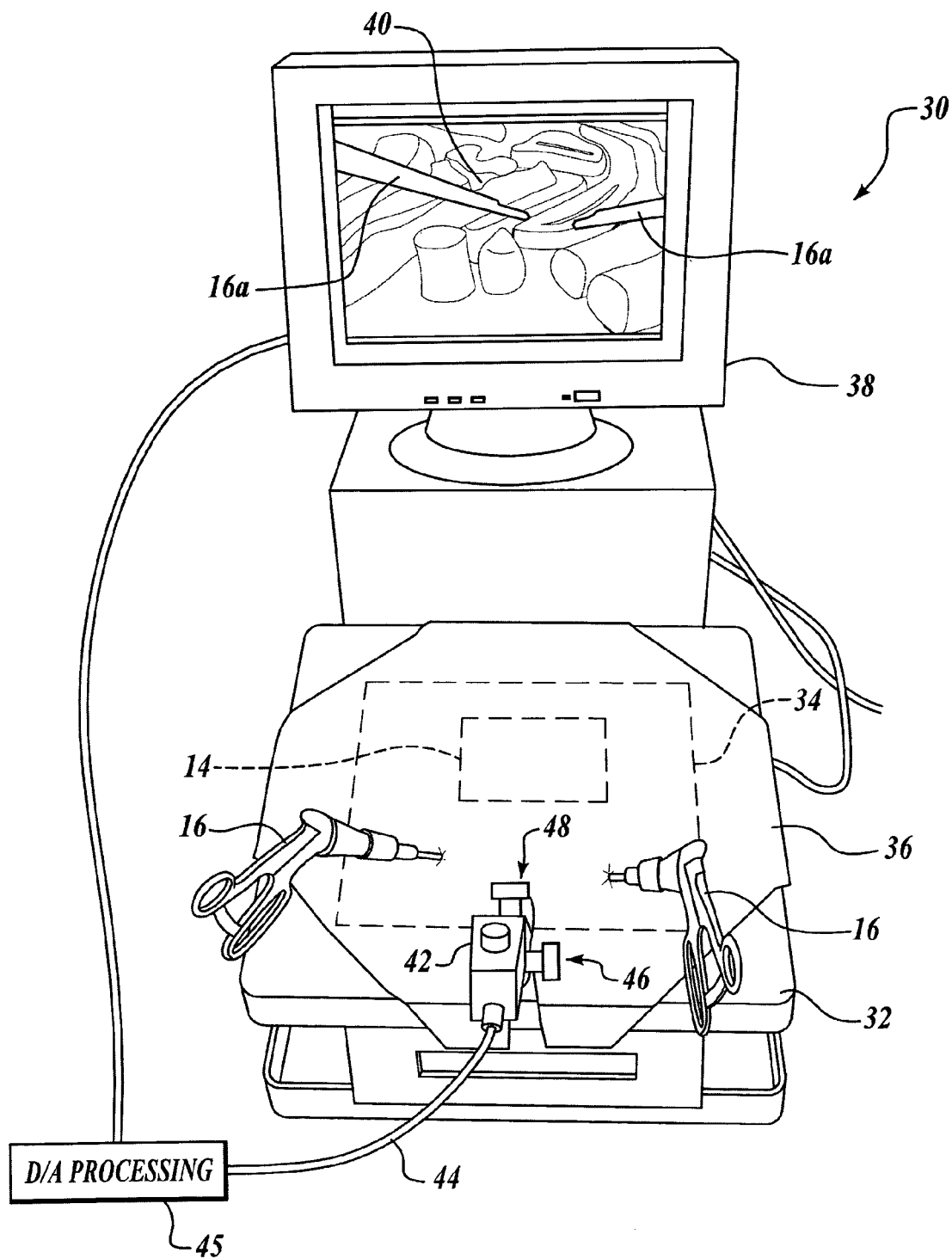

FIG. 2 schematically illustrates a training system 30 in accord with the present invention, which provides the same type of image a surgeon would view during an actual endoscopic procedure. System 30 includes a box trainer into which a digital camera is disposed within a practice volume defined by the box trainer. The digital camera is connected to a computing device (not separately shown), which drives a display 38, so that a trainee can observe a simulated surgical field upon the display generally as would be experienced during an actual endoscopic or laparoscopic procedure. The trainer portion of system 30 is preferably implemented using a box trainer having a housing 32 that defines the practice volume within the housing. An upper portion of housing 32 includes an opening 34, which is covered by either a clear or an opaque cover 36. An opaque cover prevents a trainee from viewing the practice area and encourages the trainee to view the progress of a simulated endoscopic procedure on display 38.

A simulated anatomical structure 14 is contained within housing 32. One or more surgical instruments 16 pass through openings in cover 36 to access the practice volume defined by housing 32. In one embodiment, cover 36 is a plastic sheet that is placed over opening 34. When a trainee desires to introduce instruments 16 into the practice volume, holes can readily be formed into cover 36 using a scalpel or other object to pierce the cover. Instruments 16 are then introduced into housing 32. Of course, if desired, a trocar stop (not shown) may be inserted into a flexible elastomeric cover that is placed over opening 34, and a trocar (not shown) may be inserted into each trocar stop, to more realistically simulate the preparation of a patient for a laparoscopic procedure. Surgical instruments 16 may then be inserted through the trocars for increased realism in the training provided.

Figure 3:
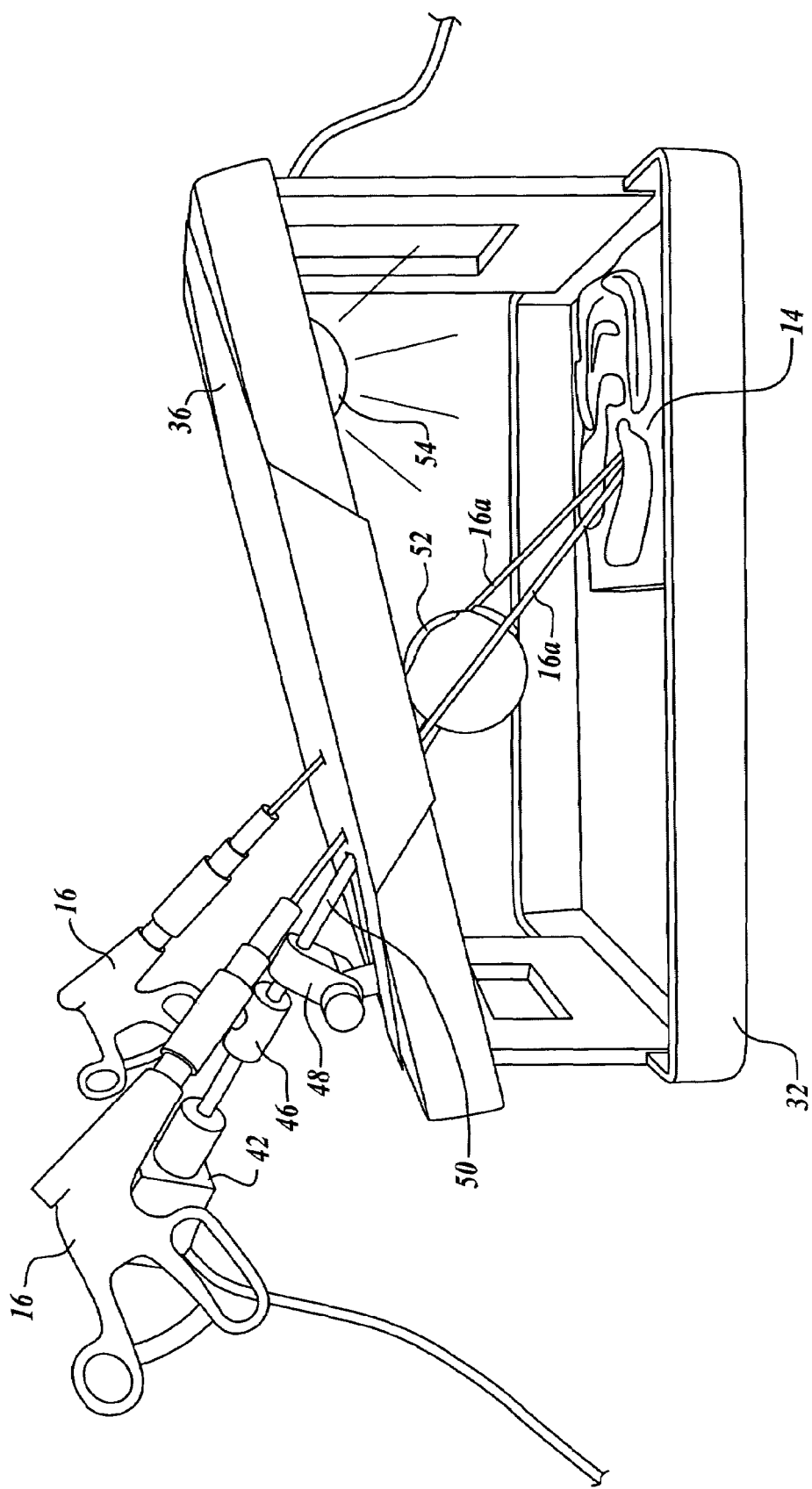
FIG. 3 is a side elevational view of a surgical trainer including a digital camera disposed inside the trainer according to a first embodiment of the present invention.

A digital camera is disposed within housing 32 and provides an output signal through output line 44 (the camera is obscured by cover 36 in FIG. 2, but can be clearly seen in FIG. 3). The output signal is used to provide a video signal for use in driving display 38. A simulated laparoscope handle 42 is included for positioning the camera to provide additional realism. As will become clear in the Figures discussed below, the digital camera is coupled with a distal end of an elongate member, and simulated laparoscope handle 42 is coupled to a proximal end of the elongate member. A trainee can then grasp the simulated laparoscope handle and move the digital camera throughout the practice volume defined by housing 32. Mounting brackets 48 and 46 movably support the elongate member.

The output signal provided by the digital camera generally requires processing to achieve a video signal suitable for driving the display. Many displays are configured to process only video red, green, blue (RGB) analog signals. Some more expensive digital cameras include digital-to-analog circuitry that produces an analog output signal suitable to drive an analog display, although it is preferred to employ a low cost digital camera (to reduce the cost of the system), which typically does not provide a video analog output signal that can directly drive an analog display. Desktop personal and laptop computers are ubiquitous, and can readily accomplish the necessary digital-to-analog signal processing required to achieve an analog signal that can be displayed on equally ubiquitous RGB analog video monitors. Further, desktop personal and laptop computers can be used to perform signal processing required so that the output signal produced by a digital camera is converted to a display signal that can be used to drive many different types of displays. Indeed, the use of a computing device such as a desktop personal computer or a laptop computer enables relatively low cost web cameras to be utilized as the digital camera. Those of ordinary skill in the art will recognize that an output signal from a digital camera can be processed to produce a display signal for many different types of display devices, including televisions configured to display an NTSC signal, televisions configured to display a PAL signal, cathode ray tube based computer monitors, LCD monitors, and plasma displays.

As shown in FIG. 2, output line 44 is coupled to a digital-to-analog converter 45, which is then connected to display 38, upon which an image 40 can be viewed. It should be understood that image 40 is obtained by a digital camera disposed within housing 32, and image 40 provides a view of distal ends 16a of surgical instruments 16 and a portion of simulated anatomical structure 14. It should be further understood that converter 45 can be implemented using a laptop or personal computer, or less desirably, by a converter circuit specifically provided for this purpose. Note that converter 45 is not required if display 38 is configured to utilize an output signal from the digital camera. It should be understood that converter 45 is configured to produce a display signal matched to the type of display 38 being employed.

It should be understood that system 30 does not require that simulated anatomical structure 14 be provided in order for the system to be used for videoendoscopic skills training. While the inclusion of simulated anatomical structure 14 does enable system 30 to be used to simulate an endoscopic or laparoscopic procedure such as suturing, system 30 can also be used for more basic videoendoscopic skills training without employing the simulated anatomical structure. For example, two-dimensional recognition skills and remote instrument manipulation are two skills that must be mastered before an endoscopic surgical procedure is simulated or attempted. For training emphasizing two-dimensional recognition skills and remote instrument manipulation, other types of objects can be substituted for simulated anatomical structure 14. Thus, a basic training exercise can be carried out using system 30 and a plurality of grains of rice that are placed within the practice volume defined by housing 32. While observing the progress of the training exercise on display 38, the trainee is instructed to use instruments 16 to move each grain of rice from one part of the practice volume to another. In such an exercise, the distal ends of instruments 16 will include forceps that the trainee manipulates remotely. While such a training exercise may seem trivial, execution of this exercise provides the trainee with practical experience in two-dimensional recognition, remote manipulation of instruments, working within a limited field of view provided by the digital camera (conventional laparoscopes and endoscopes provide a limited field of view), and performing a repetitive task under such conditions. Each such element directly relates to a skill required in endoscopic surgery. Of course, objects other than grains of rice can be similarly utilized.

The incorporation of an inexpensive digital camera within the practice volume of a box trainer achieves a very useful videoendoscopic surgical trainer. Because the digital camera is within the practice volume, the images obtained realistically simulate the type of images that are obtained using laparoscopes and endoscopes during actual surgical procedures. Regardless of whether the object in the practice volume that is being imaged is a simulated anatomical structure or some object being manipulated to develop instrument skills, having the digital camera within the practice volume, close to the object being manipulated, enables a narrow field of view to be achieved. Particularly when the digital camera is movable within the practice volume, trainees have an opportunity to selectively vary the field of view obtained by the camera, the angle of the camera relative to the objects, and the proximity of the camera to the object (i.e., the closer the camera, the larger the object will appear in the image). An important element of endoscopic surgery is properly positioning the endoscope (or laparoscope) to obtain a useable image of the surgical field.

FIG. 3 is side view of the trainer of system 30. A digital camera 52 can clearly be seen inside the practice volume defined by housing 32. Anatomical structure 14 is being manipulated by distal ends 16a of surgical instruments 16. As noted above, objects other than simulated anatomical structure 14 can be placed within the practice volume for endoscopic skills training. A light source 54 illuminates anatomical structure 14 so that digital camera 52 can obtain a clear image of anatomical structure 14 and distal ends of surgical tools 16. Digital camera 52 is coupled to a distal end of an elongate member 50, which passes through an opening formed in cover 36. Elongate member 50 is supported by a mounting bracket 48 and a mounting bracket 46. Simulated laparoscope handle 42 is attached to the proximal end of elongate member 50. Elongate member 50 is a hollow shaft, and output line 44 from digital camera 52 passes through the shaft to simulated laparoscope handle 42. The output line is then coupled to a computing device as described above, if conversion of the digital signal to produce an RGB analog signal is required.

Figure 4:
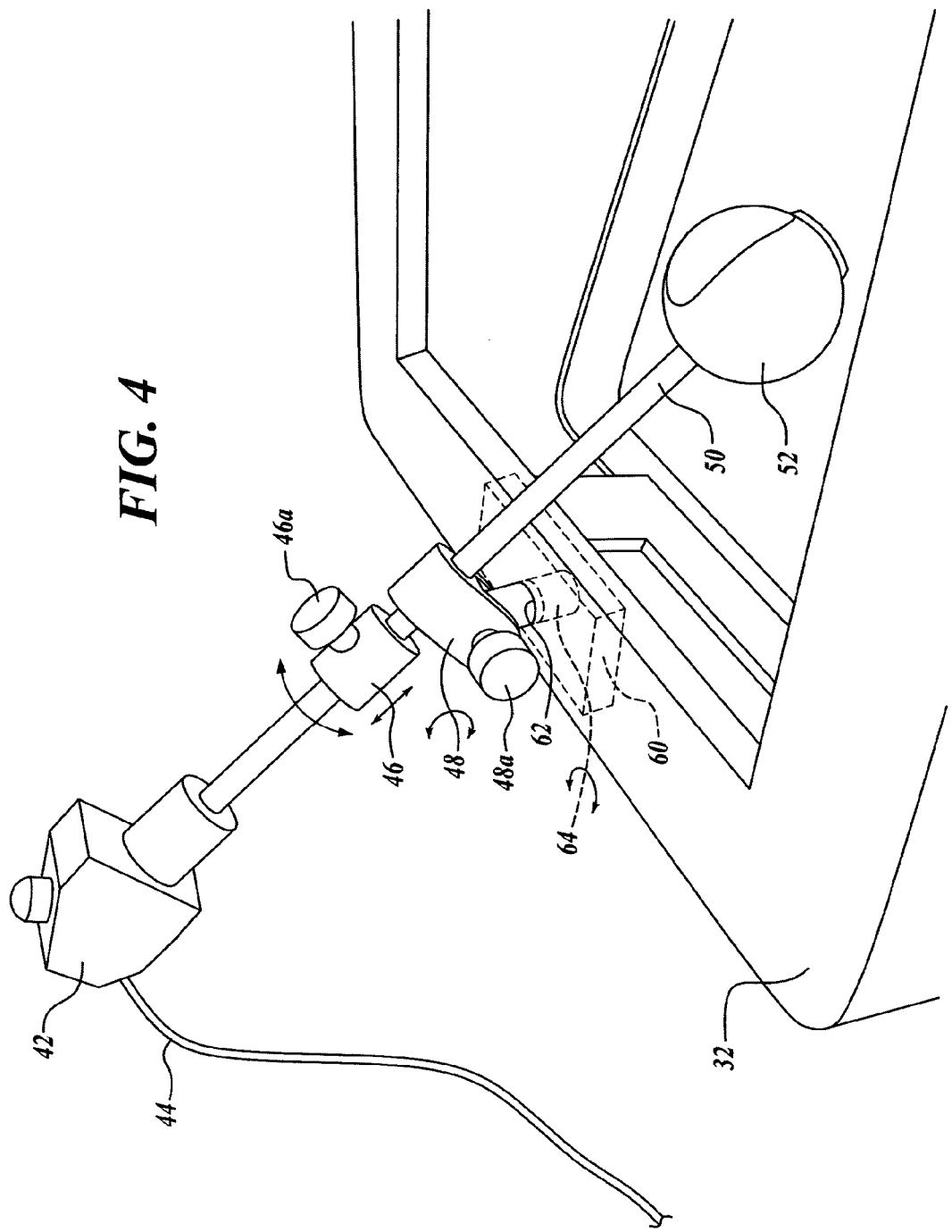
FIG. 4 is a partial view of the upper portion of the surgical trainer of FIG. 3, providing a detailed view of the support structure for the digital camera, illustrating how the support structure enables zooming, panning and tilting of the digital camera to be achieved.

FIG. 4 provides additional details showing how mounting brackets 48 and 46 movably support elongate member 50. Cover 36 has been omitted from FIG. 4 to enable the relationship between digital camera 52, elongate member 50, and mounting brackets 48 and 46 to be more clearly shown. Mounting bracket 46 substantially encompasses elongate member 50 and includes an adjustment knob 46a. When adjustment knob 46a is loosened, the elongate member 50 can be freely moved relative to mounting brackets 46 so that a trainee can adjust the position of elongate member 50 within the practice volume, relative to housing 32. Because digital camera 52 is fixedly coupled with elongate member 50, introducing more of elongate member 50 into the practice volume moves the digital camera closer to a lower portion of the practice volume. This movement of the digital camera is indicated by the arrow disposed adjacent to mounting bracket 46. Note that when adjustment knob 46a is loosened, elongate member 50 can also be rotated, causing digital camera 52 to rotate correspondingly. This adjustment feature enables the orientation of the image being displayed to be changed. The movement of the digital camera duplicates the capability of conventional laparoscopes and endoscopes to vary the view, which is often used by surgeons to obtain a useful image of the surgical field. This movement of the digital camera is indicated by the arrow disposed on elongate member 50, adjacent to mounting bracket 46.

Mounting bracket 48 enables two different types of motion to be achieved. Mounting bracket 48 includes an adjustment knob 48a and a shaft 64 and substantially encloses elongate member 50. When adjustment knob 48a is loosened, mounting bracket 48 (and elongate member 50) pivot with respect to shaft 64. This motion, referred to as tilting, is indicated by the curved arrow disposed adjacent to mounting bracket 48.

Shaft 64 is inserted into an opening 62 formed in a support block 60. Housing 32 is preferably formed of a relatively lightweight plastic material. Support block 60 provides additional support to mounting bracket 48, is fixedly coupled with housing 32, and if desired, can be formed integral to housing 32. Preferably, an interference fit exists between shaft 64 and opening 62, such that when no force is applied to elongate member 50 (or simulated laparoscope handle 42), the elongate shaft remains fixed in its then current position, and when a modest amount of pressure is applied to either elongate member 50 or simulated laparoscope handle 42, shaft 64 (and mounting bracket 48 and elongate member 50) move relative to opening 62. This motion, referred to as panning, is indicated by the curved arrow disposed adjacent to shaft 64. It should be understood that support block 60 is not required if housing 32 alone is sufficient to provide the required support. Note that elongate member 50 is introduced into the practice volume at a non-normal angle.

Figure 5:
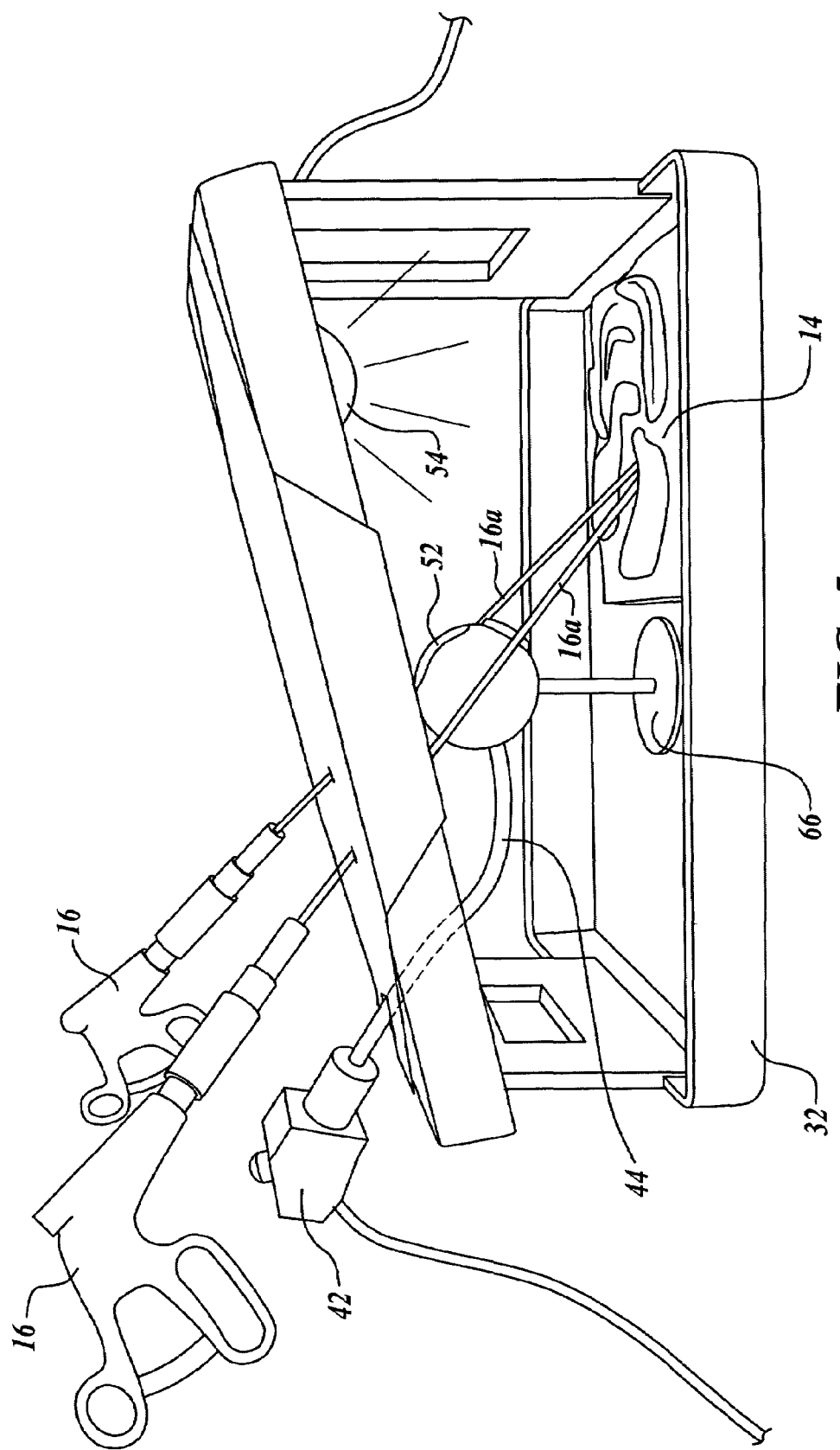
FIG. 5 is a side elevational view of a second embodiment of a surgical trainer including a digital camera disposed inside the trainer, in accord with the present invention.

FIG. 5 is a side view of an embodiment in which the digital camera is not moveably attached to a support. In this embodiment, digital camera 52 is attached to a fixed support 66. Support 66 is wholly enclosed within the practice volume defined by housing 32. Output line 44 from digital camera 52 is directed to simulated laparoscope handle 42. Optionally, a small portion of elongate member 50 can be included to simulate a laparoscope that is being used to enter a patient. It should be understood that simulated laparoscope handle 42 is not required in this embodiment or in the embodiments shown in the Figures discussed above. The purpose of simulated laparoscope handle 42 is to add realism to the simulation. In embodiments wherein the position of the digital camera is fixed, manipulation of simulated laparoscope handle 42 does not change the position of the digital camera.

Support 66 can be implemented in several different ways. For example, instead of the single shaft in a base as shown for support 66, a tripod support could be employed. In another embodiment, housing 32 is configured to be collapsible and portable. In such an embodiment, it is desirable for support 66 to include a hinge so that when support 66 is not in use, it can be folded substantially flat to enable housing 32 to be reduced in size for storage and transport purposes. Alternatively, support 66 can be removably coupled with the base of housing 32 to enable support 66 and digital camera 52 to be readily removed from the practice volume after use, so the trainer can be more compactly stored and transported.

Figure 6:
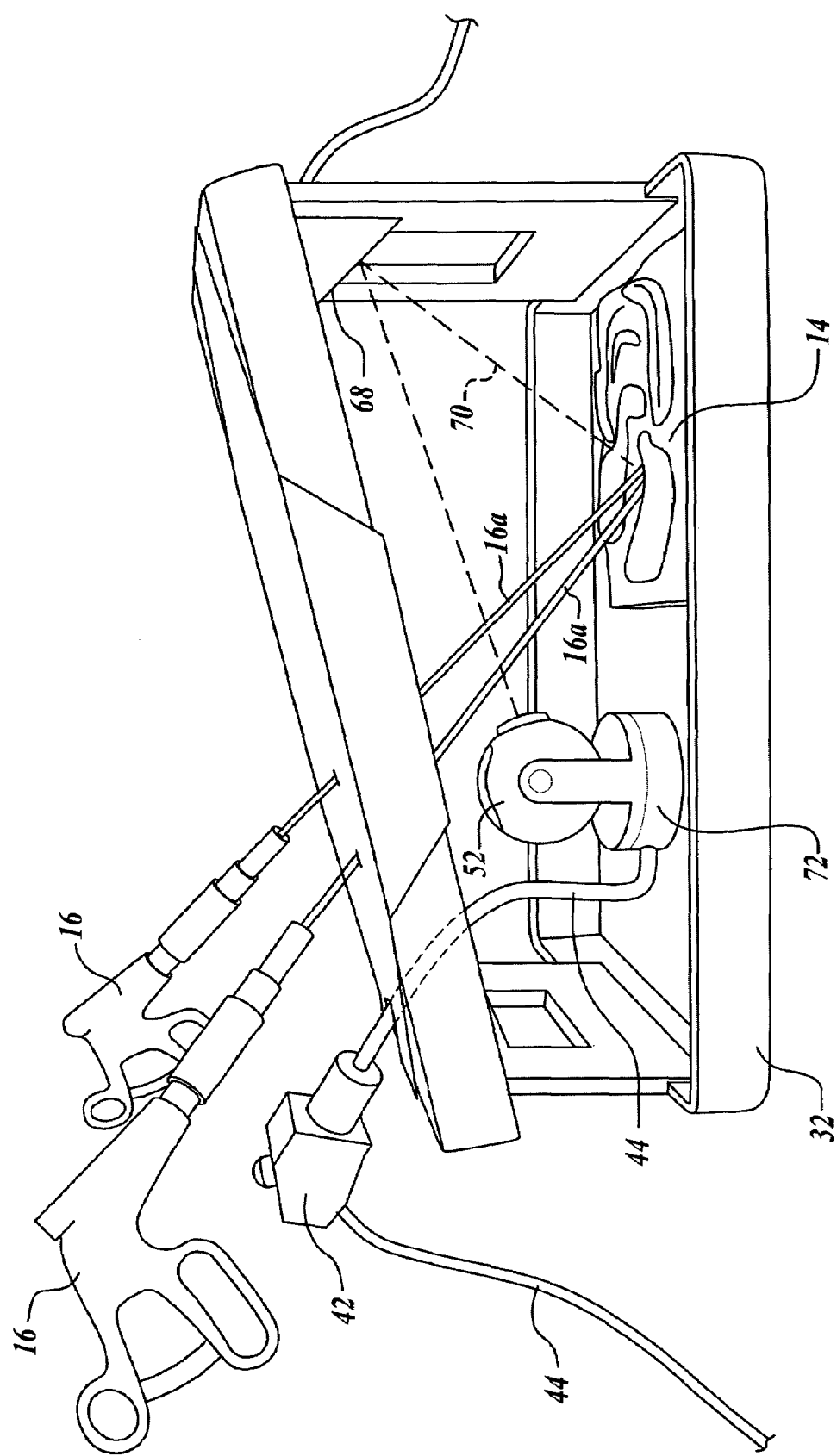
FIG. 6 is a side elevational view of yet another embodiment of a surgical trainer including a digital camera disposed inside the trainer.

FIG. 6 illustrates yet another embodiment in which digital camera 52 is attached to a mounting bracket 72 that is fully enclosed within housing 32. In this embodiment, the digital camera is disposed in a lower portion of the practice volume defined by the housing. A reflector 68 is positioned so that digital camera 52 has a bird's eye view (i.e., a top view) of anatomical structure 14. A dash line indicates a light path 70 from anatomical structure 14 to digital camera 52. Each of digital camera 52, reflector 68, and anatomical structure 14 can be fixed in position. Alternatively, one or more of digital camera 52, reflector 68, and anatomical structure 14 can be movable within the practice volume defined by housing 42.

It should be understood that mounting brackets 48 and 46 described in FIGS. 1-3 are exemplary of a configuration for movably supporting a digital camera. Those of ordinary skill in the art will recognize that many other configurations can be implemented for supporting either a digital camera or an elongate member to which a digital camera is mounted. For example, FIG. 7A illustrates a ball head mount 74 that can be used to support a digital camera. Ball head mount 74 includes a housing 82, a ball 76 enclosed within housing 82, and a plurality of adjustment levers 80. Digital camera 52 is attached to a support plate 78, which is attached to ball 76. When adjustment levers 80 are loosened, ball 76 is free to pivot about its center relative to housing 82, which enables digital camera 52 to be moved and positioned as desired. Ball mount 74 can be completely enclosed within housing 32 (as is support 66 of FIG. 5), so that ball mount 74 and digital camera 52 are not readily seen by a trainee.

FIG. 7B shows digital camera 52 that is attached to a pan and tilt head 84. Pan and tilt head 84 includes a support plate 86 and a plurality of adjustment controls 88. When adjustment controls 88 are loosened, the position of support plate 86 can be changed relative to orthogonal pan and tilt axes, as desired. Again, pan and tilt head 84 can be completely enclosed within housing 32.

FIG. 7C illustrates a ball head mount 74 used to support elongate member 50. Housing 82 is preferably disposed within housing 32, and support plate 78 is disposed outside of housing 32. Simulated laparoscope handle 42 is attached to support plate 78. When adjustment knobs 80 are loosened, the positions of simulated laparoscope handle 42, elongate member 50, and digital camera 52 can be changed as desired.

Although inexpensive digital cameras having limited functionality have been successfully used in a functional implementation of the present invention, consistent with system 30 of FIG. 2, more expensive digital cameras having greater functionality and image quality can certainly be employed in the alternative. The digital camera used in the working prototype is a QuickCam™ Messenger web camera available from Logitech Inc. of Fremont, Calif. The QuickCam™ Messenger is capable of a video capture resolution of up to 640× 480 pixels, and a frame rate of up to 30 frames per second. The 30 frames per second rate is not comparable to broadcast television quality, yet still affords useful imagery. Lower frame rates result in a displayed image in which movements are jerky. Higher frame rates can provide a smoother, higher quality image.

Higher cost digital cameras offer more functionality beyond more pixels and higher frame rates. For example, more expensive digital cameras often offer optical and/or digital zooming. While such zooming can be used to control the field of view obtained by a digital camera disposed within a trainer, the field of view obtained using a conventional laparoscope or endoscope is varied by physically repositioning the distal end of the scope and not by zooming. Mounting brackets 46 and 48 as shown in FIG. 4 enable the digital camera to be moved within the practice volume, simulating motions used to change the field of view obtained by conventional laparoscopes and endoscopes. Thus, while some users may prefer digital and optical zooming in the feature set of the digital camera, such functionality is not required.

Another functionality available in more expensive digital cameras are powered camera mounts, which enable panning and tilting to be performed under remote control. X10 (USA) Inc. of Las Vegas, Nev., the firm responsible for the ubiquitous Internet popup ads for their basic X10 digital camera, also offers the Vanguard 44X, a digital camera that provides pan, tilt, and optical and digital zooming—all under remote control. That digital camera is mounted to a base similar to the base shown in FIG. 6. The lower portion of the base rotates to enable panning, and the upper portion of the base (to which the camera is attached) controls tilt. As described above, while a less expensive digital camera movably coupled to a support enables the motion of conventional laparoscopes and endoscopes to be simulated, some users may desire the functionality of a digital camera that can pan and tilt in response to remote commands. For example, if system 30 of FIG. 2 is provided with both digital camera 52 coupled to elongate member 50, and a second digital camera that can be selectively positioned under remote control, an instructor could use the second digital camera to monitor a training exercise from a remote location. While the video signal from digital camera 52 (which provides the images displayed to the trainee) can also provide video images to an instructor at a remote location (by streaming the video signal over the Internet), the remote control digital camera enables the instructor to obtain a video signal and resulting images that are based on an angle and field of view selected by the instructor, not the trainee. If desired a single, remotely controllable camera can be included in a trainer, in place of a fixed position camera, or a digital camera coupled with an elongate support. In such an embodiment, a remote instructor can select a particular field of view within the practice volume, and instruct the trainee to perform some exercise at that location. If desired, such a remotely controllable camera can be under the trainee's control, such that the trainee can selectively pan, tilt and/or zoom to obtain an image of a desired portion of the practice volume.

The use of a digital camera also enables many different training scenarios to be supported. The images can simply be displayed during a training exercise, so that the trainee is able to view their performance on the display, just as they would appear during a videoendoscopic procedure. In systems that include a computing device or are coupled to a tape deck or other recording medium, in addition to displaying the exercise in real-time, the image data can be stored for later review. This capability will be particularly useful to instructors who may not be present during the actual exercise, so that they can later review, with or without the trainee being present, the trainee's performance during the exercise. The image data can be streamed to observers over a computer network, such as the Internet. An instructor can thus broadcast an exemplary technique over such a network to students located in others locations. Instructors can also record training videos of exemplary techniques, to be distributed to students in an electronic format. Frames of video data that are particularly illustrative or interesting can be selected and individually printed or included in training materials.

FIG. 8 schematically shows an exemplary configuration 100 in which a training system 102 is connected to a network 104 to share video data of a training exercise with remote observers 106 and 108, and optionally a remote instructor 110. It should be understood that the number of observers connected to network 104 at any one time can readily vary. Training system 102 is based on system 30 of FIG. 2, and includes a computing device that is coupled to the network. Video data captured by the digital camera are both processed to drive a display in training system 102, as well as to provide video data streamed to other users over network 104, which can be a private network used by a school or training facility, or a public network, such as the Internet. As discussed above, the video data captured by the digital video camera can be stored in digital form, for example, on a hard drive (not separately shown) of the computing device of training system 102. If desired, the training system can also couple via network 104 to a remote storage device 112, to store the image data remotely. Such remote storage is particularly useful in a scholastic environment, where students share a plurality of different training systems 102, so that each training system stores training data at a common remote storage device. As described above, in some embodiments, trainers are equipped with a second digital camera disposed within the practice volume, enabling an instructor to control the field of view of the second digital camera independent of the digital camera displaying the image to the trainee using training system 102. In such an embodiment, the second digital camera is motorized to enable pan and tilt to be remotely controlled. Instructor 110 is shown as an optional element, since not all embodiments of the present invention include a second, remotely controlled digital camera.

FIG. 9A is a flow diagram 120 that generally shows the logic for using an endoscopic surgical skills trainer including a digital camera within the practice volume to enhance videoendoscopic skills training. In a block 122, an endoscopic surgical skills trainer including a digital camera within the practice volume is provided. Any of the trainers shown in FIGS. 2, 3, 5, or 6 can be beneficially employed. In a block 124, an exercise object is introduced into the practice volume. The exercise object can be a simulated anatomical structure, or some other object that the trainee will manipulate during a training exercise. For example, as noted above, a plurality of rice grains can be employed as exercise objects. Even such simple objects can provide practical skills training. In a block 126, the digital camera is used to provide image data for display to the trainee on a video monitor, television, or other display. Optionally, a trainer can include a digital camera having a fixed position. In such an embodiment, care must be taken that the training object or objects are placed within the field of view obtainable with the fixed position digital camera. In embodiments where the digital camera is movable and positionable, block 126 can include the step of moving the digital camera so that the exercise object is in the field of view obtained by the digital camera. In a block 128, the trainee performs the exercise while viewing the progress of the exercise on the display.

FIG. 9B highlights optional steps associated with block 128. In an optional block 130, the data used to drive the display monitored by the trainee are also stored for later review. In an optional block 132, the video data are also transmitted over a network connection to enable remote observers to watch the trainee's progress during the exercise.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A videoendoscopic surgery trainer for the practice of videoendoscopic surgery techniques, the trainer comprising:
 (a) a housing defining a practice volume, the housing defining an opening through which a plurality of practice surgical tools are introduced into the practice volume;
 (b) a simulated laparoscope comprising:
  (i) a handle having a size and shape simulating a handle of a medical laparoscope;
  (ii) an elongate member extending from a distal portion of the handle into the practice volume;
  (iii) a digital video camera coupled to a distal end of the elongate member, such that manually changing a position of the proximal end of the elongate member results in a change in a position of the digital video camera, the elongate member movably supporting the digital video camera externally of the elongate member, the digital camera being thus disposed within the practice volume, the digital video camera being configured to capture a plurality of frames per second, such that the digital video camera can provide a digital video feed of at least a portion of the practice volume; and
  (iv) a data cable having a proximal end and a distal end, the distal end being logically coupled to the digital video camera, the proximal end being configured to logically couple to at least one of a display and a computing device, a first portion of the data cable extending from the digital video camera and the handle being disposed inside the elongate member, a second portion of the data cable extending from the handle to the proximal end of the data cable, the second portion of the data cable extending outwardly and away from a proximal portion of the handle, the data cable being configured to be coupled to a computing device; and
 (c) a support structure for movably supporting the simulated laparoscope relative to the housing, the support structure being coupled to an upper portion of the housing, the support structure comprising:
  (i) a first adjustable bracket configured to engage the elongate member, such that an amount of the elongate member disposed within the practice volume can be increased and decreased as desired;
  (ii) a second adjustable bracket configured to movably support the elongate structure, to enable a position of the digital video camera coupled to the distal end of the elongate member to be tilted; and
  (iii) a support member configured to support the second adjustable bracket and to pivotably engage the housing, the support member having a proximal end disposed inside the practice volume, to enable a position of the digital video camera coupled to the distal end of the elongate member to be panned;
 wherein the simulated laparoscope and support structure are disposed relative to the opening such that a student positioned at a front of the housing can use his hands to manipulate the simulated laparoscope, the support structure, and the plurality of practice surgical tools.

2. The videoendoscopic surgery trainer of claim 1, wherein the digital video camera is substantially larger than a smallest incision that would be required to insert a laparoscope into a body of a patient.

3. A videoendoscopic surgical trainer for practicing videoendoscopic surgical techniques, comprising:
 (a) a housing defining a practice volume, the housing defining an upper opening through which a plurality of practice surgical tools are introduced into the practice volume;
 (b) a simulated laparoscope comprising:
  (i) a handle having a size and shape simulating a handle of a medical laparoscope;
  (ii) a hollow elongate member extending from a distal portion of the handle into the practice volume;
  (iii) a digital imaging sensor configured to obtain an image of at least a portion of the practice volume and to output a corresponding signal that can be used to generate a video signal to drive a display, the digital imaging sensor being physically coupled to a distal end of the elongate member, such that manually changing a position of a proximal end of the elongate member results in a change in a position of the digital imaging sensor, the elongate member movably supporting the digital imaging sensor externally of the elongate member; and (iv) a data cable having a proximal end and a distal end, the distal end being logically coupled to the digital imaging sensor, the proximal end being configured to logically couple to at least one of a display and a computing device, a first portion of the data cable extending from the digital imaging sensor and the handle being disposed inside the elongate member, a second portion of the data cable extending from the handle to the proximal end of the data cable, the second portion of the data cable extending outwardly and away from a proximal portion of the handle; and (c) a support member configured to pivotally engage an upper portion of the housing, thereby enabling the digital imaging sensor to be selectively positioned within the practice volume to achieve a panning motion, and to positionably support the boom, thereby enabling the digital imaging sensor to be further selectively positioned within the practice volume;

wherein the simulated laparoscope and support structure are disposed relative to the opening such that a student positioned at a front of the housing can use his hands to manipulate the simulated laparoscope, the support structure, and the plurality of practice surgical tools.

4. The videoendoscopic surgical trainer of claim 3, wherein the support member is further configured to slidingly engage the elongate member, such that an extent by which the elongate member extends within the practice volume is selectively variable by sliding the elongate member relative to the support member.

5. The videoendoscopic surgical trainer of claim 4, wherein the elongate member extends from the support member into the practice volume at a substantially non-normal angle.

6. The videoendoscopic surgical trainer of claim 3, wherein the support member is configured to enable the digital imaging sensor to be moved in a tilting motion.

7. The videoendoscopic surgical trainer of claim 3, wherein said support member comprises:
(a) a first adjustable member configured to enable an extent to which the elongate member extends within the practice volume to be selectively controlled; and
(b) a second adjustable member configured to enable a position of the digital imaging sensor within the practice volume to be selectively changed, without also changing the extent to which the elongate member extends into the practice volume.

8. The videoendoscopic surgical trainer of claim 3, wherein the support member comprises a first portion and a second portion, such that the first portion pivotally engages the second portion, thereby enabling a position of the distal end of the support member within the practice volume to be selectively adjustable.

9. The videoendoscopic surgical trainer of claim 3, wherein the digital imaging sensor is capable of capturing at least thirty frames per second.

10. The videoendoscopic surgical trainer of claim 3, wherein the digital imaging sensor comprises a web camera.

11. A portable videoendoscopic surgical trainer for practicing videoendoscopic surgical techniques, comprising:

(a) a housing defining a practice volume, the housing comprising a collapsible frame, the frame defining a plurality of side openings facilitating access to the practice volume, and an upper opening configured to accommodate a plurality of surgical tools;

(b) a simulated laparoscope comprising:
(i) a handle having a size and shape simulating a handle of a medical laparoscope;
(ii) an elongate member extending from a distal portion of the handle into the practice volume;
(iii) a digital video camera coupled to a distal end of the elongate member, such that manually changing a position of the proximal end of the elongate member results in a change in a position of the digital video camera, the elongate member movably supporting the digital video camera externally of the elongate member, the digital camera being thus disposed within the practice volume, the digital video camera producing a digital video signal conveying images of at least a portion of the practice volume, the digital video camera being movable within the practice volume, such that a position of the digital video camera can be changed to obtain an image of a different portion of the practice volume, wherein the digital video camera is substantially larger than a smallest incision that would be required to insert a laparoscope into a body of a patient; and
(iv) a data cable having a proximal end and a distal end, the distal end being logically coupled to the digital video camera, the proximal end being configured to logically couple to at least one of a display and a computing device, a first portion of the data cable extending from the digital video camera and the handle being disposed inside the elongate member, a second portion of the data cable extending from the handle to the proximal end of the data cable, the second portion of the data cable extending outwardly and away from a proximal portion of the handle, the data cable being configured to be coupled to a computing device; and (c) a support structure movably supporting the digital video camera without substantially enveloping the digital video camera, thus enabling the digital video camera to be movably positioned within the practice volume to change a position of the digital video camera so as to obtain an image of a different portion of the practice volume;

wherein the simulated laparoscope and support structure are disposed relative to the opening such that a student positioned at a front of the housing can use his hands to manipulate the simulated laparoscope, the support structure, and the plurality of practice surgical tools.

12. A videoendoscopic surgical trainer for practicing videoendoscopic surgical techniques, comprising:

(a) a housing defining a practice volume and an upper opening through which a plurality of practice surgical tools are introduced into the practice volume;

(b) a simulated laparoscope comprising:
(i) a handle having a size and shape simulating a handle of a medical laparoscope;
(ii) an elongate member extending from a distal portion of the handle into the practice volume;
(iii) a digital video camera disposed within the practice volume, the digital video camera producing a digital video signal conveying images of at least a portion of the practice volume;

(iv) a data cable having a proximal end and a distal end, the distal end being logically coupled to the digital video camera, the proximal end being configured to logically couple to at least one of a display and a computing device, a first portion of the data cable extending between a location inside the practice volume proximate the digital video camera and the handle being disposed inside the elongate member, a second portion of the data cable extending from the handle to the proximal end of the data cable, the second portion of the data cable extending outwardly and away from a proximal portion of the handle, the data cable being configured to be coupled to a computing device; and (v) a support structure disposed within the practice volume, the support structure being supported by a base of the housing, the digital video camera being coupled to and supported by the support structure, the support structure enabling the digital video camera to be movably positioned within the practice volume to change a position of the digital video camera so as to obtain an image of a different portion of the practice volume, the support structure movably supporting the digital video camera without substantially enveloping the digital video camera;

wherein the simulated laparoscope and support structure are disposed relative to the opening such that a student positioned at a front of the housing can use his hands to manipulate the simulated laparoscope, the support structure, and the plurality of practice surgical tools.

13. The videoendoscopic surgical trainer of claim 12, wherein the digital video camera is substantially larger than a smallest incision that would be required to insert a laparoscope into a body of a patient.

14. The videoendoscopic surgical trainer of claim 12, wherein the support structure includes at least one of a ball head that enables the digital video camera to pan and tilt, and a pan and tilt head.

15. The videoendoscopic surgical trainer of claim 12, wherein the housing comprises a replaceable top panel.

16. The videoendoscopic surgical trainer of claim 12, wherein the digital video camera comprises a web camera.

17. A method for using an imaging device to enhance a session of endoscopic skills training, comprising the steps of:

(a) introducing at least one exercise object into a practice volume of a surgical trainer that includes a simulated laparoscope, the simulated laparoscope comprising:

(i) a handle having a size and shape simulating a handle of a medical laparoscope;

(ii) an elongate member extending from a distal portion of the handle into the practice volume;

(iii) a digital imaging device coupled to a distal end of the elongate member and disposed within the practice volume, the digital imaging device producing a digital video signal conveying images of at least a portion of the practice volume; and (iv) a data cable having a proximal end and a distal end, the distal end being logically coupled to the digital imaging device, the proximal end being configured to logically couple to at least one of a display and a computing device, a first portion of the data cable extending between a location inside the practice volume proximate the digital imaging device and the handle being disposed inside the elongate member, a second portion of the data cable extending from the handle to the proximal end of the data cable, the second portion of the data cable extending outwardly and away from a proximal portion of the handle, the data cable being configured to be coupled to a computing device;

(b) using the digital imaging device to produce a signal conveying images of the at least one exercise object from a first position within the surgical trainer while using a surgical tool to manipulate the at least one exercise object, wherein the digital imaging device is substantially larger than a distal end of a conventional laparoscope, such that the digital imaging device is too large to pass through an incision used to introduce such a conventional laparoscope into a patient;

(c) displaying the images of the at least one exercise object conveyed by the signal in regard to the first position;

(d) manually adjusting a first bracket and a second bracket in order to manipulate the elongate member that movably supports the digital imaging device at the distal end of the elongate member, so that the imaging device produces a signal conveying images of the at least one exercise object from a second position within the surgical trainer; and (e) displaying the images of the at least one exercise object conveyed by the signal in regard to the second position, such that the simulated laparoscope and the at least two brackets are disposed relative to the opening such that a student positioned at a front of the surgical trainer can use his hands to manipulate the simulated laparoscope, the at least two brackets, and the surgical tool.

18. The method of claim 17, wherein the step of manipulating the boom further comprises the step of locking the elongate member once the imaging device is positioned to produce the signal conveying images of the simulated anatomical structure from the second position, to prevent undesired further movement of the imaging device.

19. The method of claim 17, further comprising the step of transmitting data over a network that can be used to display images collected by the imaging device.

20. The method of claim 17, further comprising the step of storing data that are usable to display images collected by the imaging device after the session is complete.

21. The method of claim 17, wherein the step of manipulating the elongate member further comprises at least one of the steps of:

(a) zooming the imaging device closer to the at least one exercise object, to move the imaging device from the first position to the second position;

(b) zooming the imaging device farther from the at least one exercise object, to move the imaging device from the first position to the second position;

(c) panning the imaging device to move the imaging device from the first position to the second position; and (d) tilting the imaging device to move the imaging device from the first position to the second position.

* * * * *